US009432243B2

United States Patent
Burckart et al.

(10) Patent No.: US 9,432,243 B2
(45) Date of Patent: Aug. 30, 2016

(54) RE-USING ASYNCHRONOUS SERVER-SIDE RESULTS GENERATED FOR A REQUEST CONTEXT OF ONE CLIENT TO SATISFY A REQUEST CONTEXT OF A DIFFERENT CLIENT

(75) Inventors: Erik J. Burckart, Raleigh, NC (US); Andrew J. Ivory, Wake Forest, NC (US); Todd E. Kaplinger, Raleigh, NC (US); Maxim A. Moldenhauer, Durham, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1298 days.

(21) Appl. No.: 11/851,092

(22) Filed: Sep. 6, 2007

(65) Prior Publication Data
US 2009/0055469 A1    Feb. 26, 2009

Related U.S. Application Data

(63) Continuation-in-part of application No. 11/843,038, filed on Aug. 22, 2007, and a continuation-in-part of application No. 11/846,423, filed on Aug. 28, 2007.

(51) Int. Cl.
*G06F 15/16* (2006.01)
*H04L 29/08* (2006.01)
*G06F 17/30* (2006.01)

(52) U.S. Cl.
CPC ......... *H04L 29/08729* (2013.01); *G06F 17/30* (2013.01); *H04L 67/2833* (2013.01)

(58) Field of Classification Search
USPC ...................................................... 709/203
See application file for complete search history.

(56) References Cited

U.S. PATENT DOCUMENTS 5,944,779 A    8/1999    Blum
6,112,243 A    8/2000    Downs et al.
(Continued)

FOREIGN PATENT DOCUMENTS

JP    2001109715 A    4/2001
JP    2000067012 A    3/2003
(Continued)

OTHER PUBLICATIONS

IBM—Application No. 08786988.9-15-712179376; Office Action dated Nov. 2015-Feb. 2013; pp. 1-11.

*Primary Examiner* — Andrew Goldberg
(74) *Attorney, Agent, or Firm* — Patents on Demand P.A.; Brian K. Buccheit; Scott M. Garrett

(57) ABSTRACT

The present invention provides a solution for sharing server generated output to satisfy requests for content originated by different clients. More specifically, a server side resource can analyze a content request and compare this request to a set of active request handling operations. When one of the active operations is capable of satisfying a discrete portion of the content request, an association can be established between the active operation and the content request. When the active operation produces results, these results are returned to satisfy a request of an original client as well as to satisfy a request of a client that issued the content request. The solution can be implemented in a variety of environments, including one where asynchronous server-side operations are conducted by different server-side resources for a single request context.

9 Claims, 2 Drawing Sheets

(56) References Cited

U.S. PATENT DOCUMENTS

| | | | |
|---|---|---|---|
| 6,457,047 B1* | 9/2002 | Chandra | G06F 17/30902 707/E17.12 |
| 6,505,257 B2 | 1/2003 | Murata et al. | |
| 6,578,076 B1* | 6/2003 | Putzolu | 709/223 |
| 6,651,143 B2 | 11/2003 | Mounes-Toussi | |
| 6,665,704 B1* | 12/2003 | Singh | 709/203 |
| 6,961,776 B1 | 11/2005 | Buckingham et al. | |
| 6,963,917 B1 | 11/2005 | Callis et al. | |
| 7,051,330 B1* | 5/2006 | Kaler et al. | 718/106 |
| 7,127,713 B2 | 10/2006 | Davis et al. | |
| 7,130,885 B2 | 10/2006 | Chandra et al. | |
| 7,209,915 B1 | 4/2007 | Taboada et al. | |
| 7,373,438 B1* | 5/2008 | DeBergalis et al. | 710/40 |
| 7,398,301 B2* | 7/2008 | Hennessey et al. | 709/217 |
| 7,447,731 B2 | 11/2008 | Calo et al. | |
| 7,490,343 B1* | 2/2009 | Gordon et al. | 725/54 |
| 7,496,554 B2* | 2/2009 | Kaplan | |
| 7,502,760 B1 | 3/2009 | Gupta | |
| 7,536,472 B2* | 5/2009 | O'Neal et al. | 709/233 |
| 7,590,752 B2* | 9/2009 | van Oldenborgh et al. | 709/231 |
| 2002/0111814 A1 | 8/2002 | Barnett | |
| 2004/0017395 A1 | 1/2004 | Cook | |
| 2004/0103413 A1 | 5/2004 | Mandava et al. | |
| 2004/0117801 A1* | 6/2004 | Eibach et al. | 719/314 |
| 2004/0205108 A1 | 10/2004 | Tanaka | |
| 2004/0264385 A1* | 12/2004 | Hennessey et al. | 370/252 |
| 2005/0044233 A1 | 2/2005 | Cai et al. | |
| 2005/0125508 A1 | 6/2005 | Smith et al. | |
| 2005/0198118 A1 | 9/2005 | Viger et al. | |
| 2005/0234914 A1* | 10/2005 | Ishii et al. | 707/10 |
| 2007/0143460 A1 | 6/2007 | Ben-David et al. | |
| 2007/0156876 A1* | 7/2007 | Sundarrajan et al. | 709/223 |
| 2007/0226342 A1 | 9/2007 | Apelbaum | |
| 2008/0059499 A1* | 3/2008 | Parkinson et al. | 707/101 |
| 2008/0071922 A1 | 3/2008 | Chetuparambil et al. | |
| 2008/0127234 A1 | 5/2008 | Hesmer et al. | |
| 2008/0183825 A1* | 7/2008 | Alicherry et al. | 709/206 |
| 2009/0063618 A1 | 3/2009 | Chetuparambil et al. | |

FOREIGN PATENT DOCUMENTS

| | | |
|---|---|---|
| JP | 2003141072 A | 5/2003 |
| JP | 2004000018 A | 1/2004 |
| JP | 2006311013 A | 11/2006 |

* cited by examiner

RE-USING ASYNCHRONOUS SERVER-SIDE RESULTS GENERATED FOR A REQUEST CONTEXT OF ONE CLIENT TO SATISFY A REQUEST CONTEXT OF A DIFFERENT CLIENT

CROSS-REFERENCE TO RELATED APPLICATIONS

This continuation-in-part application claims the benefit of U.S. patent application Ser. No. 11/843,038 filed Aug. 22, 2007, and the benefit of U.S. patent application Ser. No. 11/846,423 filed Aug. 28, 2007, both of which are incorporated by reference herein.

BACKGROUND

1. Field of the Invention

The present invention relates to HTTP request handling and, more particularly, to re-using asynchronous server-side results generated for a request context of one client to satisfy a request context of a different client.

2. Description of the Related Art

U.S. patent application Ser. No. 11/846,423 entitled "Method and Apparatus for Client-Side Aggregation of Asynchronous Fragmented Requests" disclosed a solution for client side aggregation of asynchronous context-sensitive request operations in a single application server environment. A concept of client-side content aggregation is extended by U.S. patent application Ser. No. 11/843,038, entitled "Client-Side Aggregation of Context-Sensitive Request Results Where Results for Aggregation are Asynchronously Produced by Multiple Servers" which teaches client-side aggregation of context-sensitive request results where results are asynchronously handled by multiple servers.

With the advent of asynchronous request dispatching, one or more application servers can handle simultaneous, asynchronous requests for different requesting clients. A possibility arises that two or more of these concurrently handled requests to produce identical content. For example, a first client can request a portal page, which includes a default news portlet. The news portlet can include dynamically generated content produced by a server in response to an asynchronous request for the portlet content. Soon after, a second client can request a portal page, which also includes the default news portlet. By default, a separate asynchronously request for the news portlet information will be initiated and have to be handled separate from the request for the first client. This scenario results in two concurrent requests ultimately rendering the same content, which represents a duplication of effort at multiple layers (e.g., thread creation, duplicate response output, unnecessary request processing, and the like).

SUMMARY OF THE INVENTION

The present invention provides a solution for sharing server generated output to satisfy request for content originated by different clients. More specifically, a server side resource can analyze a content request and compare this request to a set of active request handling operations. When one of the active operations is capable of satisfying a discrete portion of the content request, an association can be established between the active operation and the content request. When the active operation produces results, these results are returned to satisfy a request of an original client as well as to satisfy a client that issued the content request. The solution can be implemented in an environment where asynchronous server-side processes are used to handle a single request context, where each asynchronous process represents an operation able to be shared by multiple clients. Additionally, the asynchronous server-side processes can execute within multiple servers for a single request context, yet still produce results shared by multiple clients.

The present invention can be implemented in accordance with numerous aspects consistent with the material presented herein. For example, one aspect of the present invention can include a server-side request handling system that includes a set of programmatic instructions stored in a machine readable medium, which cause the machine to re-use asynchronous server-side processing results generated for a request context of one client to satisfy different request context of a different client.

Another aspect of the present invention can include a server-side request handling system that includes an active operations table and an operation handler. The active operations table can be stored in a machine readable medium that is accessible by the operation handler. The active operations table can store records for operations currently executing to produce results for received requests. The operation handler can be a software program stored in a machine readable medium and executed by a server-side resource that is configured to receive a request, to execute an operation, and to produce a result for the request. The operation handler can add records to the active operations table for each operation that the operation handler executes. The operation handler can remove records from the active operations table after executed operations have produced results. Before executing an operation to handle a received request, the operation handler can query the active operations table to determine whether a currently executing operation is able to handle the received request. When the query indicates that a currently executing operation is able to handle the received request, the received request can be associated with the currently executing operation so that results from the currently executing operation are used to handle a multiple requests. The multiple requests can include the received request and an original request for which the currently executing operation was initiated.

Still another aspect of the present invention can include a method for sharing processed server results. In the method, a first request can be received for processing. An operation can begin executing for the first request. A second request can be received for processing while the operation is still executing. The second request can be associated with the executing operation. Execution of the operation can complete that produces a result. The produced result can be utilized to satisfy the first request and the second request.

It should be noted that various aspects of the invention can be implemented as a program for controlling computing equipment to implement the functions described herein, or as a program for enabling computing equipment to perform processes corresponding to the steps disclosed herein. This program may be provided by storing the program in a magnetic disk, an optical disk, a semiconductor memory, or any other recording medium. The program can also be provided as a digitally encoded signal conveyed via a carrier wave. The described program can be a single program or can be implemented as multiple subprograms, each of which interact within a single computing device or interact in a distributed fashion across a network space.

BRIEF DESCRIPTION OF THE DRAWINGS

There are shown in the drawings, embodiments which are presently preferred, it being understood, however, that the invention is not limited to the precise arrangements and instrumentalities shown.

DETAILED DESCRIPTION OF THE INVENTION

Figure 1:
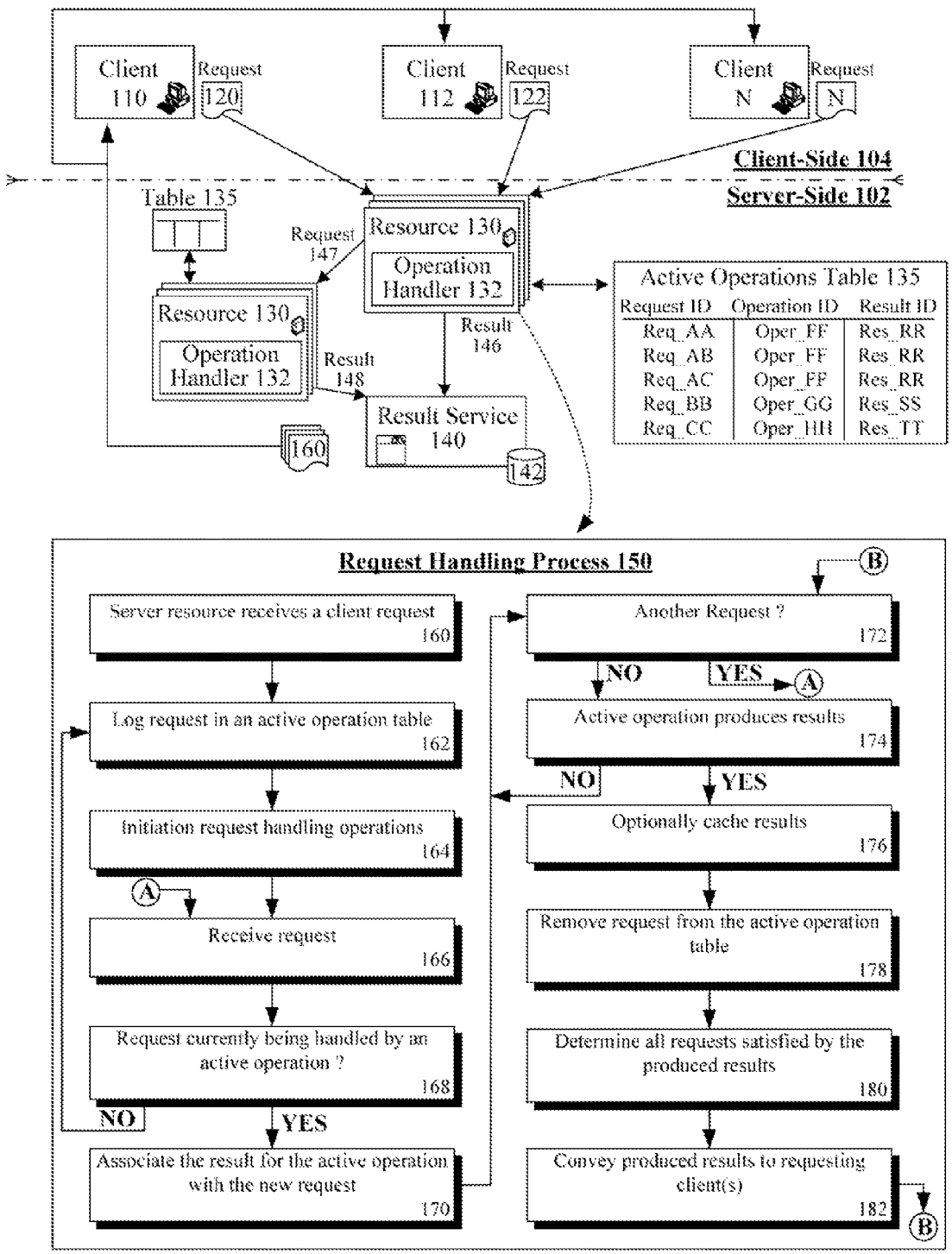
FIG. 1 is a schematic diagram of a system in which server-side results are shared by multiple request issuing clients in accordance with an embodiment of the inventive arrangements disclosed herein.

FIG. 1 is a schematic diagram of a system 100 in which server-side 102 results are shared by multiple request issuing clients 110, 112 in accordance with an embodiment of the inventive arrangements disclosed herein. In system 100, two or more clients 110, 112 can issue requests 120, 122 to a server-side 102 resource 130. The second request 122 can be issued when the first request 120 is still being processed. At least a portion of the results produced for request 120 can be identical to results needed to satisfy request 122. Instead of redundantly and individually handling two approximately concurrent requests 120, 122 for the same content, system 100 executes a single operation that produces results that are shared by client 110 and client 112, For example, each request 120, 122 can be for content related to a user customizable portal, where each portal includes a default news related portlet. Content for the news portlet can be dynamically generated content that will produce identical or nearly identical results 160 for both requests 120, 122. When request 122 is received by resource 130, an operation that produces news portlet content for client 110 can be active. This active operation can he detected, when processing for request 122 is initiated, and instead of issuing a separate thread/process for handling the news portlet content for request 122, the active thread/process for this content for request 120 can be identified and linked to the second request 122. The news portlet results 160 from the active operation can be conveyed to both clients 110 and 112.

A process flow 150 for the result sharing system 100 is shown by steps 160-182. The request handling process can begin when a server resource (i.e., resource 130) receives a request, as shown by step 160. In step 162, the request (i.e., request 120, 122, or 147) can be logged in an active operation table (i.e. table 135) or other memory space. In step 164, request handling operations can be initiated. In step 166, another request can be received for handling. The new request can be similar to a request currently being handled by an active operation, which causes the process to proceed from step 168 to step 170, or can be different than currently active operations, which causes the process to proceed from step 168 to step 162.

In step 170 when a similar request is in the process of being handled, a result for the active operation handling the original request can also be associated with the new request. In step 172, when another request is received the process can proceed to step 166, where the request is received and handled. Otherwise, the process can progress from step 172 to step 174, where a check can be conducted to see if an active operation has produced results. If no results have been produced, the process can again check for more requests in step 172. When results are produced, the method can progress from step 174 to step 176, where the results can be optionally cached. This step can be implemented for a system designed to convey cached results to clients under a deterministic set of conditions, such as when a processing time out limit is reached.

In step 178, all requests that are satisfied by the produced results can be determined along with requesting client addresses. In one implementation, this information can be obtained by querying the active operation table. In step 180, all entries in the active operation table associated with the results can be removed. In step 182, produced results can be conveyed to the requesting client(s). The process can repeat for other requests, which is shown by the process proceeding from step 182 to step 172.

It should be appreciated that although a specific embodiment is expressed in system 100, the request handling process 150 can be performed by any server-side 102 system. The represented embodiment is one in which a singe request context is able to be asynchronously handled by one or more resources 130, which deliver results 146, 148 to a result server 140, which in turn conveys results 160 to clients 110-112. Additionally, in the shown embodiment, the clients 110-112 can asynchronously aggregate the received content 160 for a request context. In a different embodiment (not shown), server-side 102 aggregation of content can occur. In still another embodiment (not shown) a single resource 130 (e.g., a Web server) can handle requests (i.e., using an included/accessible handler 132 and table 135) and can directly deliver shared results 160 to multiple clients 110-112 without using the result service 140. Further, in different contemplated arrangements of system 100, the shared result 160 can either fully satisfy the requests 120, 122 or can satisfy only a common portion of the requests 120, 122 (e.g., the requests 120, 122 can both reference a common portlet or other shared result segment).

Referring to the illustrated embodiment of system 100, an implementation is shown that is capable of client-side 104 aggregation of content asynchronously handled by multiple server-side resources 130. As shown, when an operations handler 132 receives a request 120, 122, and/or 147 it can consult an active operations table 135 to determine if an already executing operation exists that can satisfy the new request. For example, requests of table 135 can be identified by a unique identifier Req-AA, Req_AB, and Req_AC, which are linked to the same executing operation (e.g., an operation with an identifier of Oper_FF). When no currently executing operation satisfies the new request, a new entry can be added to the table 135 (i.e., an entry for a request identified by Req_BB), and a new operation can be initiated (i.e., an operation identified as Oper_GG). As soon as results are produced 146, 148, these results can be recorded in table 135 for dissemination to clients 110-112, shown by conveying response 160 to clients 110-112. The table 135 can include numerous other fields (not shown) such as requestor address, request authorization code, and the like, which can be used to ensure delivery of results to authorized clients 110-112.

As used in system 100, the resources 130 can be part of a computing system capable of handling Hypertext Transfer Protocol (HTTP) requests from a network and of providing HTTP responses to these requests. Each of the resources 130 can be associated with a Uniform Resource Identifier (URI) used for resource 130 identification when conveying HTTP requests. The HTTP responses can include static and dynamic content. In one embodiment, an initial response produced by a request receiving resource 130 can include static content and one or more placeholders. Placeholder content can be produced by different resources 130, which receive request 147, which results in dynamic content. Each resource 130 can include numerous optional features, such as authentication support, encrypted channel support (e.g., HTTPS support through Transport Layer Security (TLS) technologies, Secure Sockets Layer (SSL) technology, and the like), content compression and decompression support, and the like. Each of the resources 130 can allocate resources to process a received request 120, 122, 147 and can release these resources once that resource's processing tasks are completed. That is, a time period in which any of the resources 130 is used to handle a request context can be less than a total time needed to handle the request context. The resources 130 can be implemented within physical machines as well as virtual computing devices, such as those provided through visualization solutions (e.g., VMWARE, MS VIRTUAL SERVER, and the like).

The result service 140 can be a server-side 102 software program able to handle HTTP and other RESTful messages. A RESTful message is a message conforming to the Representational State Transfer (REST) software architecture. A REST architecture provides a uniform interface exists that includes a few basic primitive commands (e.g., HTTP GET, HTTP PUT, HTTP POST, HTTP DELETE). REST based solutions simplify component implementation, reduce the complexity of connector semantics, improve the effectiveness of performance tuning, and increase the scalability of pure server components.

The result service 140 can be implemented as a servlet, a JAVA Server Page (JSP), an Active Server Page (ASP), an Enterprise Java Bean (EJB), an Enterprise Service Bus (ESB) service, and the like. The service 140 can be associated with a URI to which the resources 130 can convey results 146, 148 and to which the clients 110-112 can convey content requests. The result distribution service 140 can reside within resource 130, or any other computing component. When the service 140 is associated with a component other than the one addressed in the original HTTP request, then system 100 must implement measures to ensure that the URLs of the service 140 are available to the resources 130 and the clients 110-112.

Each of the clients 110-112 can be any computing device capable of sending HTTP request 120, 122 and capable of rendering responses to these requests. For example, the client 110-112 can include a personal computer, a notebook computer, a mobile computing device, a smart phone, a personal data assistant. (PDA), an embedded computing device, an electronic gaming system, and the like. Client 110, 112 can include a browser, which handles HTTP communications. The browser can be linked to an interface with which a user interacts with client 110, 112. The interface can be a graphical user interface (GUI), a multi-modal interface, a voice user interface (VUI), and the like. Interface can include content and placeholders.

The various components of system 100 can be communicatively linked via a network (not shown). The network can include components capable of conveying digital content encoded within carrier waves. The content can be contained within analog or digital signals and conveyed through data or voice channels and can be conveyed over a personal area network (PAN) or a wide area network (WAN). The network can include local components and data pathways necessary for communications to be exchanged among computing device components and between integrated device components and peripheral devices. The network can also include network equipment, such as routers, data lines, hubs, and intermediary servers which together form a packet-based network, such as the Internet or an intranet. The network can further include circuit-based communication components and mobile communication components, such as telephony switches, modems, cellular communication towers, and the like. The network can include line based and/or wireless communication pathways.

The data store 142 and other data stores (not shown) linked to resources 130 or clients 110, 112 can be physically implemented within any type of hardware including, but not limited to, a magnetic disk, an optical disk, a semiconductor memory, a digitally encoded plastic memory, a holographic memory, or any other recording medium. Data store 142 can be a stand-alone storage unit as well as a storage unit formed from a plurality of physical devices which may be remotely located from one another. Additionally, information can be stored within the data store 142 in a variety of manners. For example, information, such as table 135, can be stored within a database structure or can be stored within one or more files of a file storage system where each file may or may not be indexed for information searching purposes. Information stored in data store 142 can also be optionally encrypted for added security.

Figure 2:
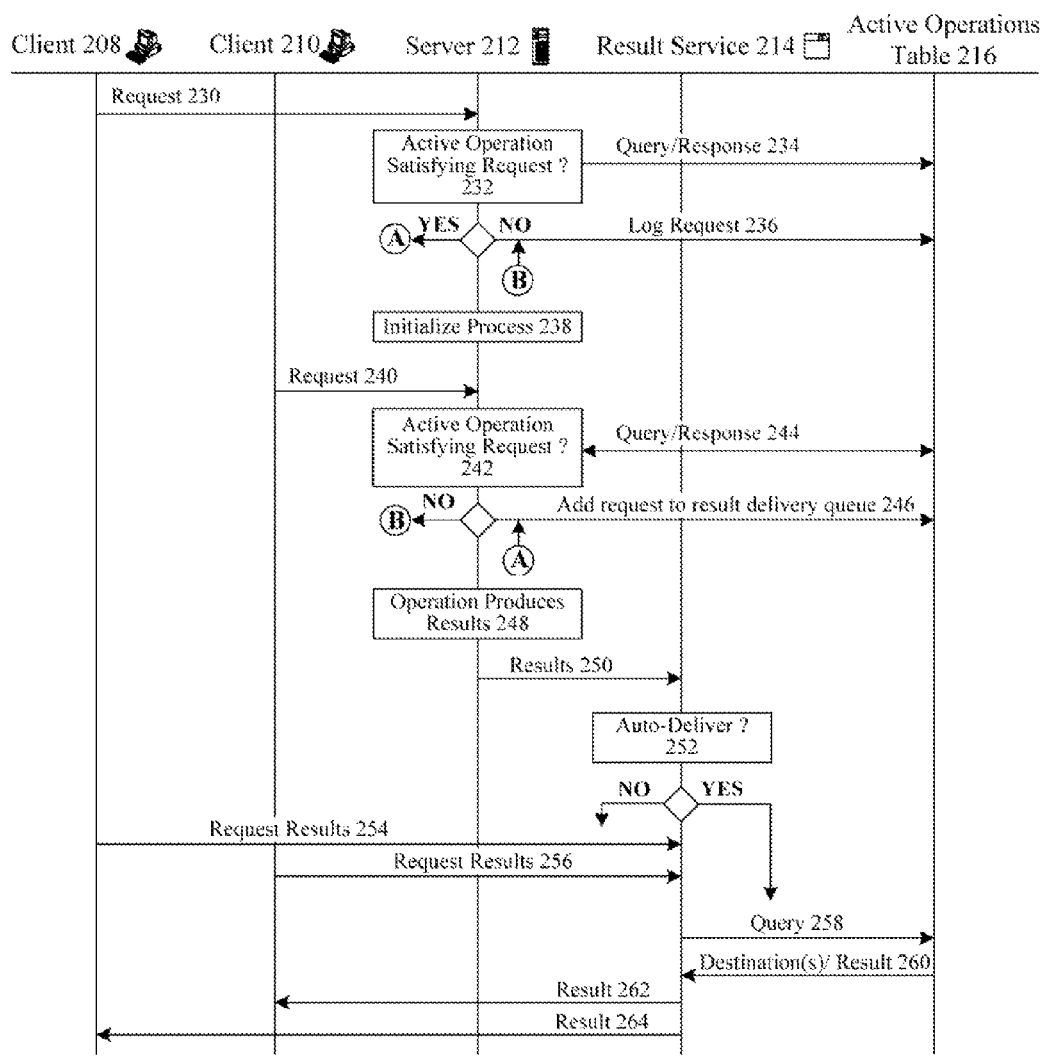
FIG. 2 is a flow diagram showing a set of messages exchanged in a system that shares results among multiple requesting clients in accordance with an embodiment of the inventive arrangements disclosed herein.

FIG. 2 is a flow diagram 200 showing a set of messages exchanged in a system that shares results among multiple requesting clients in accordance with an embodiment of the inventive arrangements disclosed herein. The flow diagram 200 can be performed in the context of system 100 or any other client-server system, where client requests are handled asynchronously by one or more server resources.

In diagram 200, a client 208 can convey a request 230 to a server 212. The server 212 can determine 232 whether an active operation is currently executing that is capable of handling the request 230. This can be done by querying 234 an active operations table 216 and receiving results 234 in response. When no active operations satisfy the request 230, the request and/or operations to be executed to handle the request 230 can be logged in the active operations table 216. The handling operations can then be initiated 238.

While this operation is executing, another request 240 can be conveyed from client 210 to server 212. The server 212 can determine 242 whether an active operation is currently executing that is capable of handling the request 240, which is performed by querying 244 table 21.6 an receiving a response 244. In diagram 200, requests 230 and 240 can be substantially identical and can be satisfied by executing the same programmatic operations. Therefore, a message 246 to add request 240 to a result delivery queue can be conveyed to table 216. Eventually, the initiated process 238 can produce results 248. These results can be conveyed 250 to a result delivery service 214. When the server 214 does not have an active auto-delivery feature, the clients 208 and 210 must send messages to service 214 requesting results 254, 256.

When an auto delivery feature 252 exists or when requests 254, 256 are received, the result service 214 can query 258 the active operations table to determine which clients 208, 210 are to receive 260 the results. The querying 258 can also remove entries form the table 216 relating to the client 208, 210 and/or the operations/results (if all clients that are to receive the results have queried the table 216). The caveat is provided because clients 208, 210 can asynchronously query service 214 for the results in one contemplated configuration. The service 214 can then convey the result 262, 264 to the requesting clients 208, 210.

The present invention may be realized in hardware, software, or a combination of hardware and software. The present invention may be realized in a centralized fashion in one computer system or in a distributed fashion where different elements are spread across several interconnected computer systems. Any kind of computer system or other apparatus adapted for carrying out the methods described herein is suited. A typical combination of hardware and software may be a general purpose computer system with a computer program that, when being loaded and executed, controls the computer system such that it carries out the methods described herein.

The present invention also may be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention may be embodied in other forms without departing from the spirit or essential attributes thereof. Accordingly, reference should be made to the following claims, rather than to the foregoing specification, as indicating the scope of the invention.

What is claimed is:

1. A method for sharing processed server results for dynamically rendering portlets at client machines, comprising:
   receiving at a server via a network using hypertext transfer protocol (HTTP) from a first client a first request for processing at the server, wherein the first client is a computing device;
   determining, by the server, that there is no pending operation that can satisfy the first request based on an active operation table;
   executing an operation in response to the first request that will produce a result to satisfy the first request, and wherein the operation is executed by a computing machine;
   logging, by the server, the operation in the active operation table, wherein the active operation table is stored in a memory associated with the server, and wherein the active operation table associates a first request identifier received with the first request with an operation identifier for the operation;
   receiving, at the server, a second request for processing at the server via the network from a second client using HTTP while the operation is still executing, wherein the second client is a computing device;
   comparing, by the server, logged entries in the active operation table against the second request;
   determining, by the server as a result of comparing logged entries in the active operation table, that the second request is able to be satisfied by the executing operation based on the first request as logged in the active operation table;
   associating, by the server, the second request with the executing operation in the active operation table in response to determining that the second request is able to be satisfied by the executing operation, wherein the active operation table associates a second request identifier received with the second request with the operation identifier for the operation;
   completing execution of the operation to produce a result;
   removing, by the server, the first request identifier and the second request identifier from the active operation table; and
   utilizing the produced result to satisfy the first request and the second request by conveying the produced result to the first and second clients via the network and rendering portlets at the first and second clients that include the produced result;
   wherein removing the first request identifier and the second request identifier from the active operation table occurs prior to satisfying the first and second requests.

2. The method of claim 1, wherein receiving the first request comprises receiving a first request for a dynamically generated result, and executing the operation comprises generating the dynamically generated result, and wherein the dynamically generated content is not cached after satisfying the second request.

3. The method of claim 1, further comprising:
   conveying the processed result from a processing server to a result service; and
   conveying the processed result from the result service to a plurality of clients, wherein one of the plurality of clients issued a first message that is associated with the first request, and wherein a different one of the plurality of clients issued a second message that is associated with the second request.

4. The method of claim 3, further comprising: each of the plurality of clients asynchronously sending a message to the result service requesting the processed result, wherein the processed result is conveyed to each of the clients responsive to a receipt of a sent message.

5. The method of claim 3, further comprising: a receiving server that received the first request and that received the second request sending a request to a different server, which is the processing server.

6. The method of claim 5, further comprising: the receiving server generating a plurality of asynchronous requests for the first message, which includes the request sent to the processing server as well as another request sent to still another server for processing.

7. The method of claim 1, wherein the operation is one of a plurality of asynchronous server-side operations executed in response to a client issued request.

8. The method of claim 7, wherein different servers handle different ones of the plurality of asynchronous server side operations.

9. The method of claim 1, wherein said steps of claim 1 are steps performed automatically by at least one machine in accordance with at least one computer program having a plurality of code sections that are executable by the at least one machine, said at least one computer program being stored in a machine readable medium.

* * * * *